US009080796B2

(12) United States Patent
Shaikh et al.

(10) Patent No.: US 9,080,796 B2
(45) Date of Patent: Jul. 14, 2015

(54) MOTOR VEHICLE CLIMATE CONTROL SYSTEM

(71) Applicant: Ford Global Technologies, LLC, Dearborn, MI (US)

(72) Inventors: Furqan Zafar Shaikh, Troy, MI (US); Michael Levin, Ann Arbor, MI (US); Danrich Henry Demitroff, Okemos, MI (US); Don Masch, White Lake, MI (US); Jim Patrick O'Neill, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 241 days.

(21) Appl. No.: 13/739,817

(22) Filed: Jan. 11, 2013

(65) Prior Publication Data
US 2014/0053579 A1 Feb. 27, 2014

Related U.S. Application Data

(60) Provisional application No. 61/693,728, filed on Aug. 27, 2012.

(51) Int. Cl.
*F25B 27/00* (2006.01)
*B60H 1/00* (2006.01)
*B60H 1/14* (2006.01)
*B60H 1/32* (2006.01)

(52) U.S. Cl.
CPC *F25B 27/00* (2013.01); *B60H 1/00* (2013.01); *B60H 1/143* (2013.01); *B60H 1/3201* (2013.01)

(58) Field of Classification Search
CPC ........ D25B 27/00; B60H 1/00; B60H 1/3201; B60H 1/143; Y02T 10/166

USPC ............ 62/79, 477, 478, 479, 486, 244, 239, 62/476
See application file for complete search history.

(56) References Cited

U.S. PATENT DOCUMENTS

| | | | | |
|---|---|---|---|---|
| 4,694,659 A | * | 9/1987 | Shelton | 62/106 |
| 4,765,395 A | * | 8/1988 | Paeye et al. | 165/104.12 |
| 4,881,376 A | * | 11/1989 | Yonezawa et al. | 62/106 |
| 5,161,389 A | * | 11/1992 | Rockenfeller et al. | 62/480 |
| 5,231,849 A | * | 8/1993 | Rosenblatt | 62/238.3 |

(Continued)

FOREIGN PATENT DOCUMENTS

| | | |
|---|---|---|
| EP | 0601875 A1 | 6/1994 |
| WO | 9421976 | 9/1994 |
| WO | 200815188 A1 | 12/2008 |

*Primary Examiner* — Mohammad M Ali
(74) *Attorney, Agent, or Firm* — Julia Voutyras; Alleman Hall McCoy Russell & Tuttle LLP

(57) ABSTRACT

A vehicle climate control system operable in a winter mode and a summer mode includes an engine-exhaust-driven hot heat transfer fluid (HTF) circuit coupled with a heater core during the winter mode to provide passenger cabin heating, and thermal energy stored in a standalone hot phase change material (PCM) battery in the hot HTF circuit may provide surge heating at or prior to engine start. The hot HTF circuit and a cold HTF circuit including an HTF cooler drive two adsorbers in the summer mode, thereby providing passenger cabin cooling in conjunction with a refrigerant circuit which includes a condenser, evaporator, expansion valve, and standalone cold PCM battery. Thermal energy stored in the standalone cold PCM battery may provide surge cooling at or prior to engine start.

20 Claims, 9 Drawing Sheets

(56) References Cited

U.S. PATENT DOCUMENTS

| | | |
|---|---|---|
| 5,553,662 A | 9/1996 | Longardner et al. |
| 5,871,041 A | 2/1999 | Rafalovich et al. |
| 5,938,523 A * | 8/1999 | Khelifa et al. ............ 454/156 |
| 6,158,237 A * | 12/2000 | Riffat et al. ............ 62/484 |
| 6,708,512 B2 | 3/2004 | Kitamura et al. |
| 2003/0005721 A1 * | 1/2003 | Sato et al. ............ 62/480 |
| 2009/0266094 A1 | 10/2009 | Major et al. |
| 2013/0192281 A1 | 8/2013 | Nam et al. |

* cited by examiner

ADSORBING MODE

DESORBING MODE

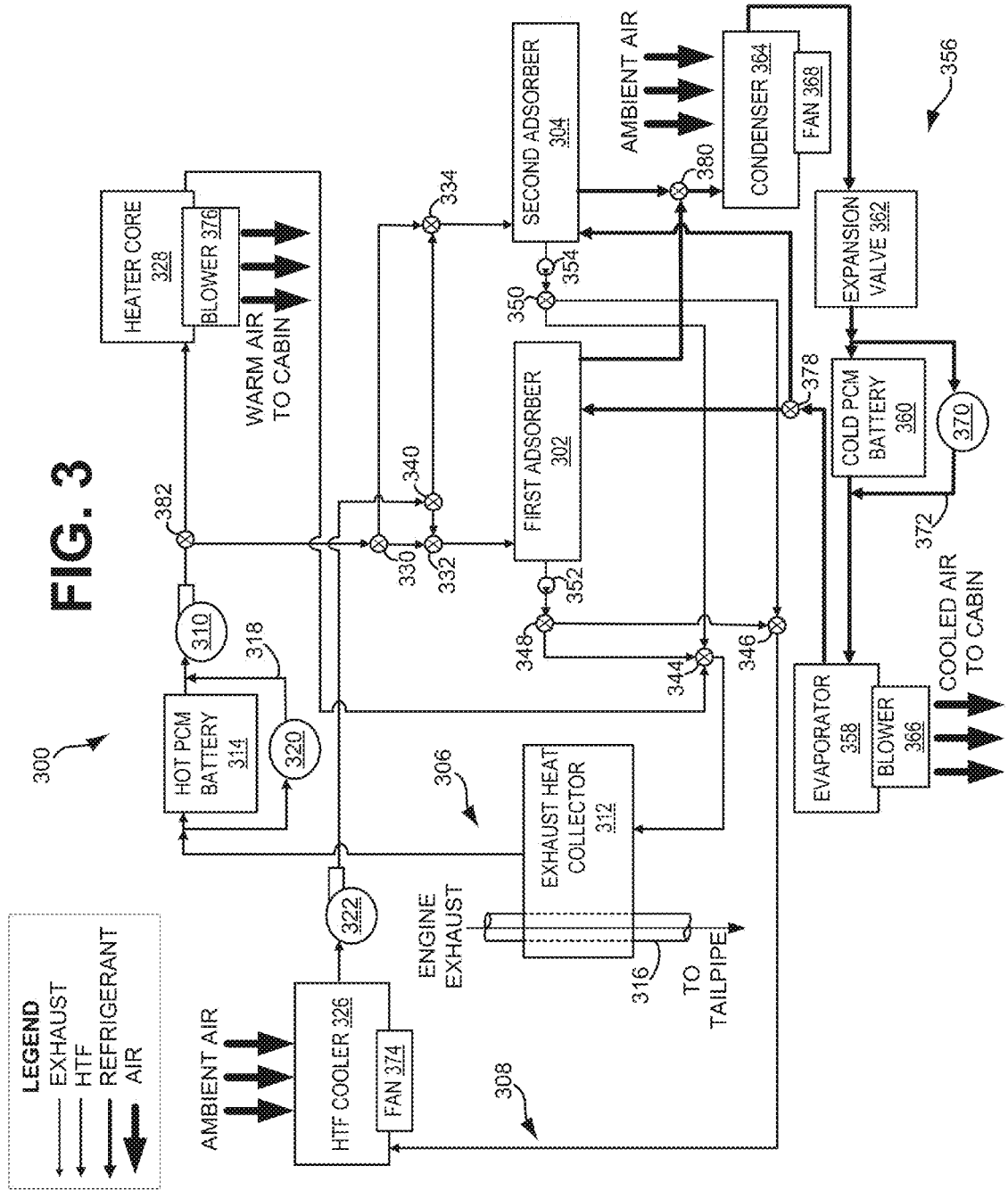

MOTOR VEHICLE CLIMATE CONTROL SYSTEM

CROSS REFERENCE TO RELATED APPLICATIONS

The present application claims priority to U.S. Provisional Application Ser. No. 61/693,728, filed on Aug. 27, 2012, the entire contents of which are hereby incorporated by reference for all purposes.

FIELD

The present description relates generally to methods and systems for a motor vehicle climate control system operable in a winter mode and a summer mode, where engine exhaust heat drives a hot heat transfer fluid circuit including a hot phase change material battery to provide passenger cabin heating via a heater core in the winter mode, and where the hot heat transfer fluid circuit and a cold heat transfer fluid circuit including a heat transfer fluid cooler drive two adsorbers in the summer mode, to provide passenger cabin cooling in conjunction with a refrigerant circuit including a condenser, evaporator, expansion valve, and a cold phase change material battery.

BACKGROUND/SUMMARY

In some motor vehicle air-conditioning systems, thermal adsorption may be used instead of compression. Thermal-adsorption air-conditioning systems use an adsorbent chemical (e.g. zeolite, silica gel, activated carbons) rather than a mechanical compressor, and are driven by thermal energy rather than mechanical work. For example, a thermal-adsorption air-conditioning system in a motor vehicle may be driven by waste exhaust heat from the vehicle's engine, whereas the compressor used in many conventional air-conditioning systems may be driven by the engine crankshaft and may exert a load on the engine. As such, air-conditioning systems utilizing thermal adsorption instead of a compressor may advantageously achieve reduced engine loading and reduced fuel consumption.

One cycle of operation of a thermal-adsorption air-conditioning system includes the adsorption of a refrigerant, e.g. water, onto a solid adsorbent, e.g. zeolite (during what is referred to herein as "adsorbing mode"), and the subsequent desorption of the refrigerant from the adsorbent (during what is referred to herein as "desorbing mode"). This process may occur in a canister referred to as an adsorber. During the adsorbing mode, the adsorbent is actively cooled, for example via a cool heat transfer fluid (HTF). The cooling of the adsorbent creates suction, such that vaporized refrigerant is drawn into the adsorber and adsorbed by the adsorbent. In a common application, the refrigerant is drawn into the adsorbent from an evaporator via the suction, such that it evaporates from the evaporator and thereby cools the evaporator. In contrast, during the desorbing mode, the adsorbent is actively heated, for example via a hot HTF. The heating of the adsorbent causes the refrigerant to be desorbed from the adsorbent. In a common application, the refrigerant flows into a condenser after being desorbed from the adsorbent, such that it condenses at the condenser and thereby heats the condenser.

US 2011/0005267 describes an automobile air-conditioning system including a thermal-adsorption heat pump which operates in conjunction with a condenser and evaporator in the manner described above. The thermal-adsorption heat pump is powered by engine exhaust heat, and includes at least two adsorbers which adsorb and desorb refrigerant cyclically and asynchronously. In one embodiment, the system includes three working fluid loops: an HTF loop for heating/cooling the adsorbers where the working fluid is a mineral-oil-based HTF, an adsorption loop entirely exterior to the passenger cabin where the working fluid may be $NH_3$, and a refrigerant loop transferring heat from the cabin to the adsorption loop (via an inter-loop heat exchanger) where the working fluid may be R-134a.

The HTF loop heats/cools the adsorbers to effect adsorption/desorption at the adsorbents within the adsorbers. Cool HTF for the adsorbing mode is provided by an HTF cooler, and hot HTF for the desorbing mode is provided by an HTF heater. Thermal reservoirs storing exhaust heat in phase change material (PCM) are coupled with the HTF heater. The adsorption loop includes $NH_3$ which is adsorbed/desorbed from the adsorbents in the adsorbers. After the engine is shut off, heat stored in the thermal reservoirs is used to desorb $NH_3$ from the adsorbents into a reservoir. $NH_3$ stored in the reservoir is then used to provide "surge cooling" after engine cold start, while HTF in the HTF loop is still being heated, in order to start thermally cycling the adsorbers and pumping refrigerant. To provide cooling to the cabin, a heat exchanger is coupled with the refrigerant loop and the adsorbent loop. At the heat exchanger, R-134a from the refrigerant loop condenses, while $NH_3$ from the adsorbent loop evaporates. The refrigerant loop further includes an R-134a evaporator communicating with the cabin to provide cooling to the cabin via a blower.

However, the inventors have recognized various issues with the above-described system. In order to provide surge cooling at engine start, $NH_3$ is stored in a pressurized reservoir in the above system. Even ignoring the safety hazards associated with storage of pressurized $NH_3$, a pressurized reservoir may be costly in terms of materials and in terms of the space it takes up in the vehicle. Further, an undesirably large reservoir may be required to store enough $NH_3$ to meet surge cooling needs during hot weather conditions. Furthermore, it may not be possible to downsize the adsorbers used in the system due to the constraints of the pressurized $NH_3$ reservoir, and therefore it may not be possible to improve the efficiency of adsorber operations and/or ensure that the system is packagable in motor vehicles.

To address these issues, among other issues, the inventors herein have identified a climate control system incorporating thermal adsorption in conjunction with a standalone cold PCM battery and a standalone hot PCM battery, and methods for its operation. In one example, a method for a vehicle climate control system includes, during a summer mode, driving two adsorbers with HTF heated by engine exhaust in a hot HTF circuit and HTF cooled by an HTF cooler in a cold HTF circuit, and charging a standalone cold phase PCM battery communicating with the adsorbers. The method further includes, during a winter mode, coupling the hot HTF circuit with a heater core.

In this way, by charging a standalone cold PCM battery during summer mode operation of the climate control system, thermal energy may be stored in the battery for use in a surge cooling mode at a subsequent engine start. Because of the advantages of PCM storage of thermal energy (e.g., as opposed to storing thermal energy via pressurized $NH_3$), it may be possible to downsize the adsorbers, thereby improving packagability of the climate control system and thermal adsorption efficiency. Further, a hot PCM battery may be included in the climate control system to provide surge heating during winter mode operation of the climate control system. Accordingly, downsized adsorbers may be sufficient for winter mode operation of the climate control system as well.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3 schematically shows the climate control system of FIG. 1.

DETAILED DESCRIPTION

The following description relates to systems and methods for cooling a passenger cabin of a motor vehicle via a climate control system utilizing thermal instead of mechanical compression, in conjunction with standalone cold PCM and hot PCM batteries. During summer mode operation, engine exhaust heat drives two adsorbers which, in conjunction with an evaporator and condenser, provide cooling to the passenger cabin. The cold and hot PCM batteries may be used in conjunction with the adsorbers, evaporator, and condenser to provide surge cooling of the passenger cabin prior to or at engine start. In contrast, during winter mode operation, engine exhaust heats HTF which flows through a heater core to heat the passenger cabin. The hot PCM battery may be used in conjunction with the heater core to provide surge heating of the passenger cabin prior to or at engine start.

Figure 1:
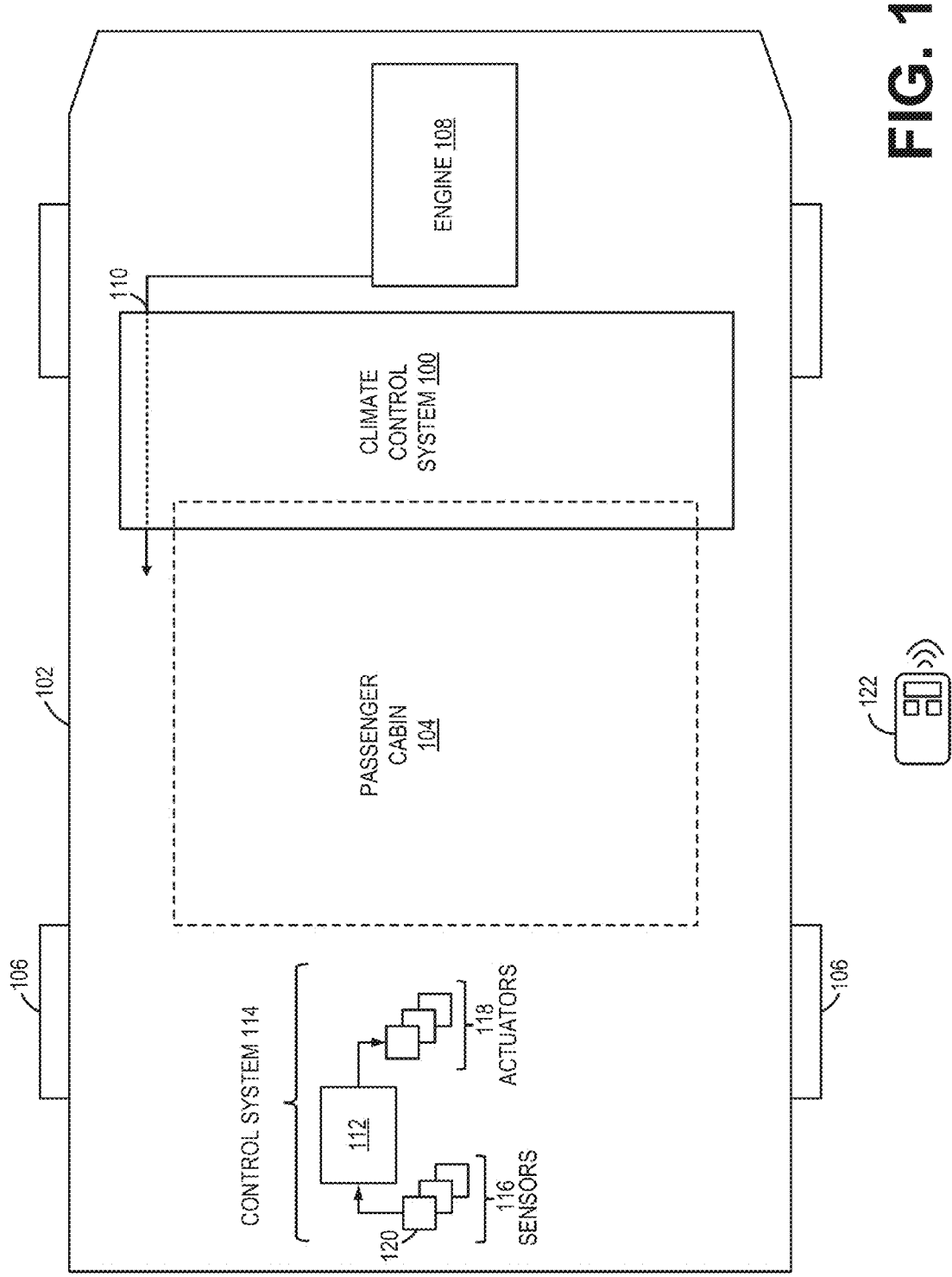
FIG. 1 schematically shows a motor vehicle incorporating the climate control system described herein.

As shown in FIG. 1, the climate control system may be thermally coupled with an engine exhaust conduit but may not otherwise communicate with or load the vehicle's engine.

Figure 2A:
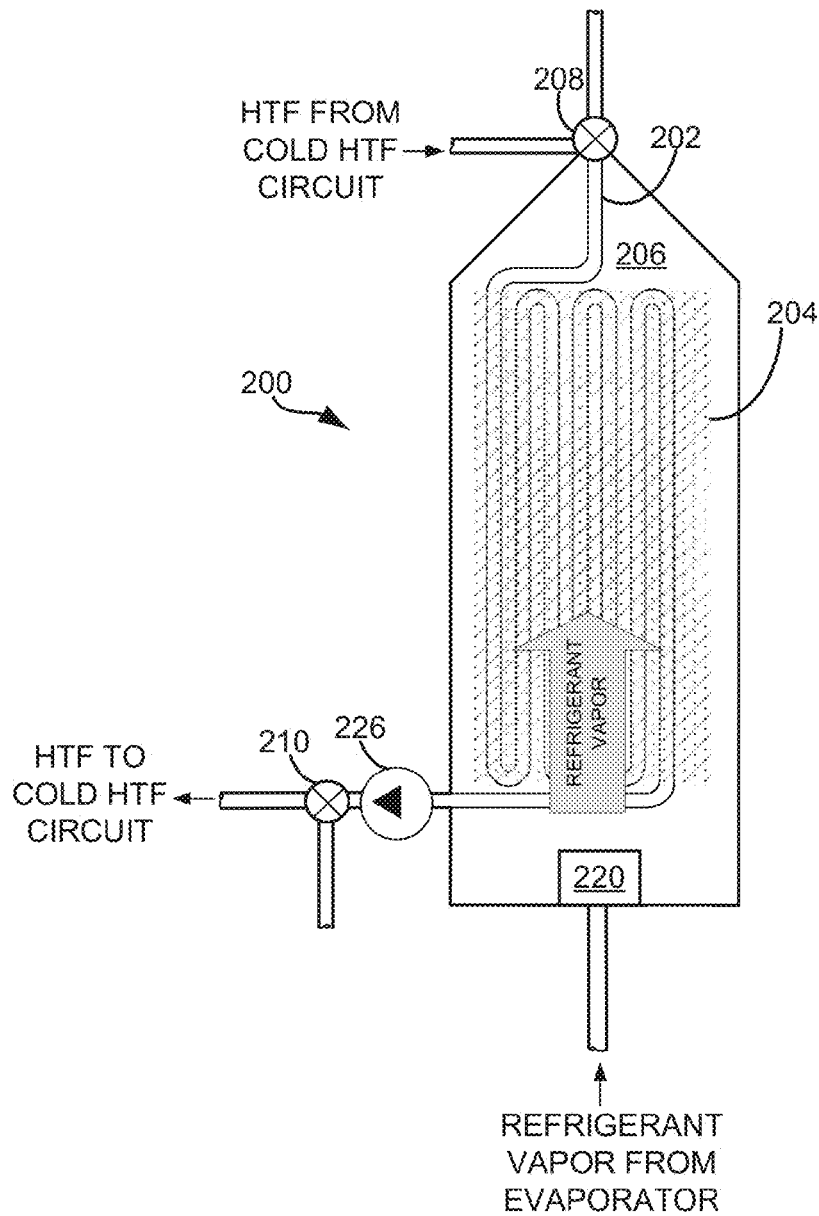
FIG. 2A shows a cross-sectional view of an example adsorber in an adsorbing mode. Two such adsorbers may be included in the climate control system of FIG. 1.
Figure 2B:
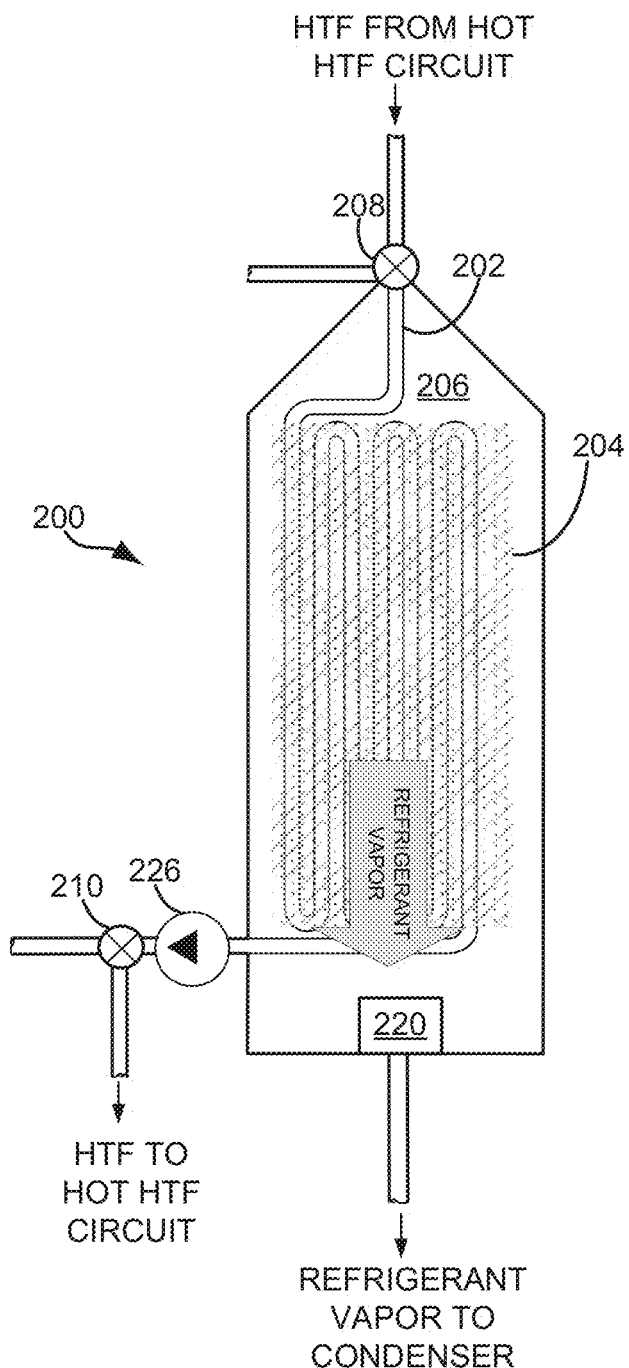
FIG. 2B shows a cross-sectional view of the example adsorber of FIG. 2A in a desorbing mode.
Figure 4:
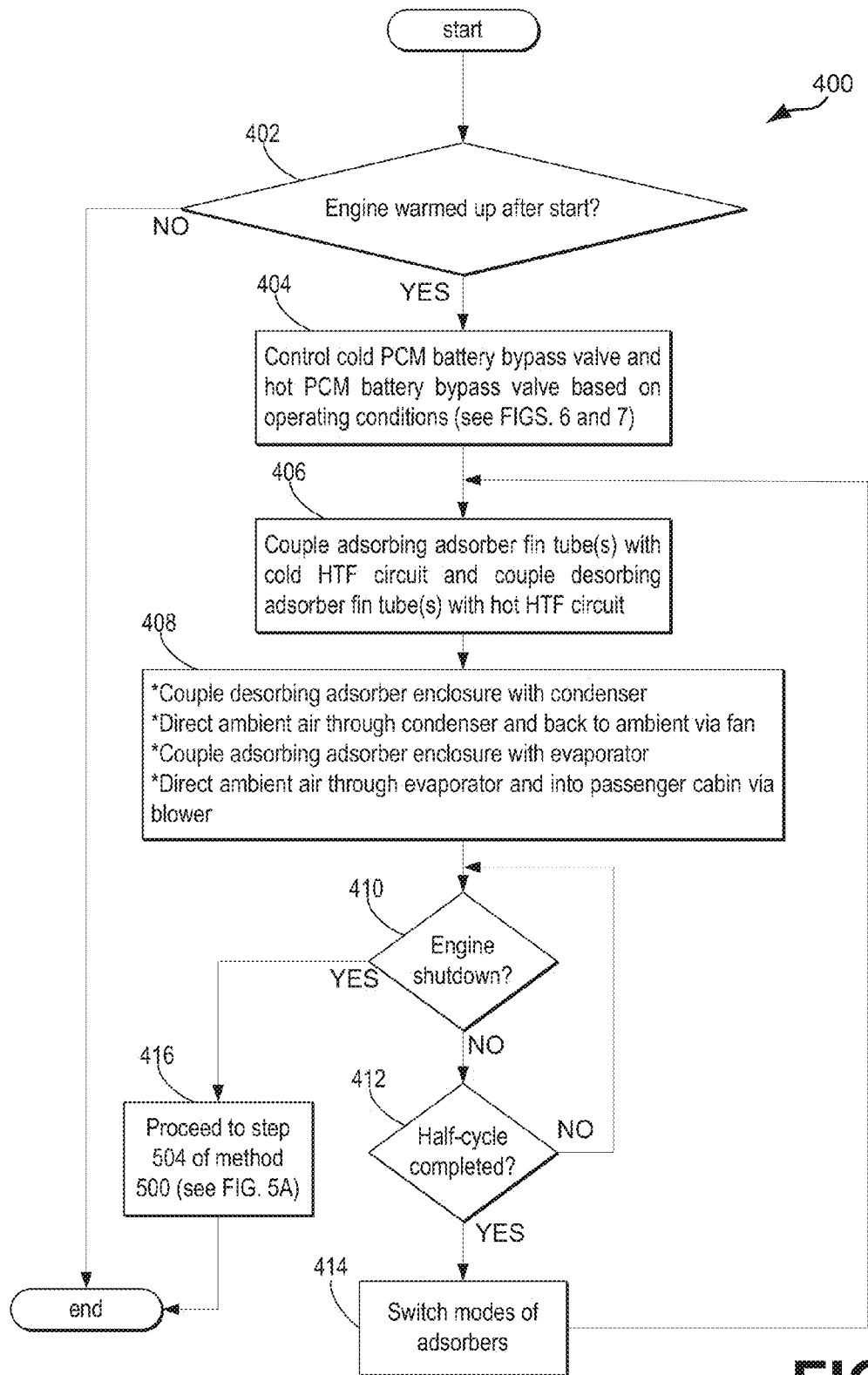
FIG. 4 depicts an example method for operating the climate control system of FIG. 1 in a summer mode after the engine has warmed up from an engine start.
Figure 5A:
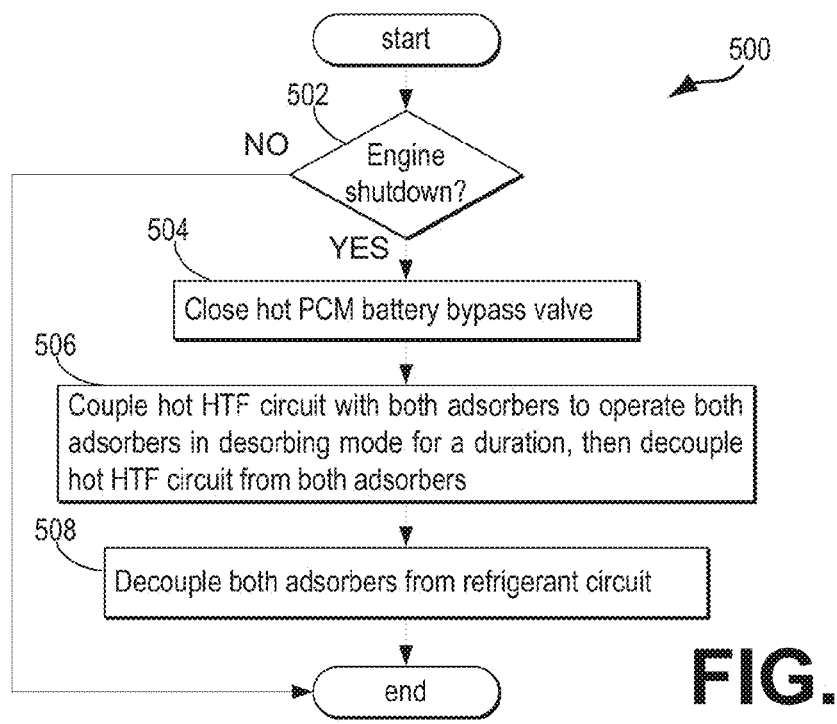
FIG. 5A depicts an example method for operating the climate control system of FIG. 1 in the summer mode after engine shutdown.
Figure 5B:
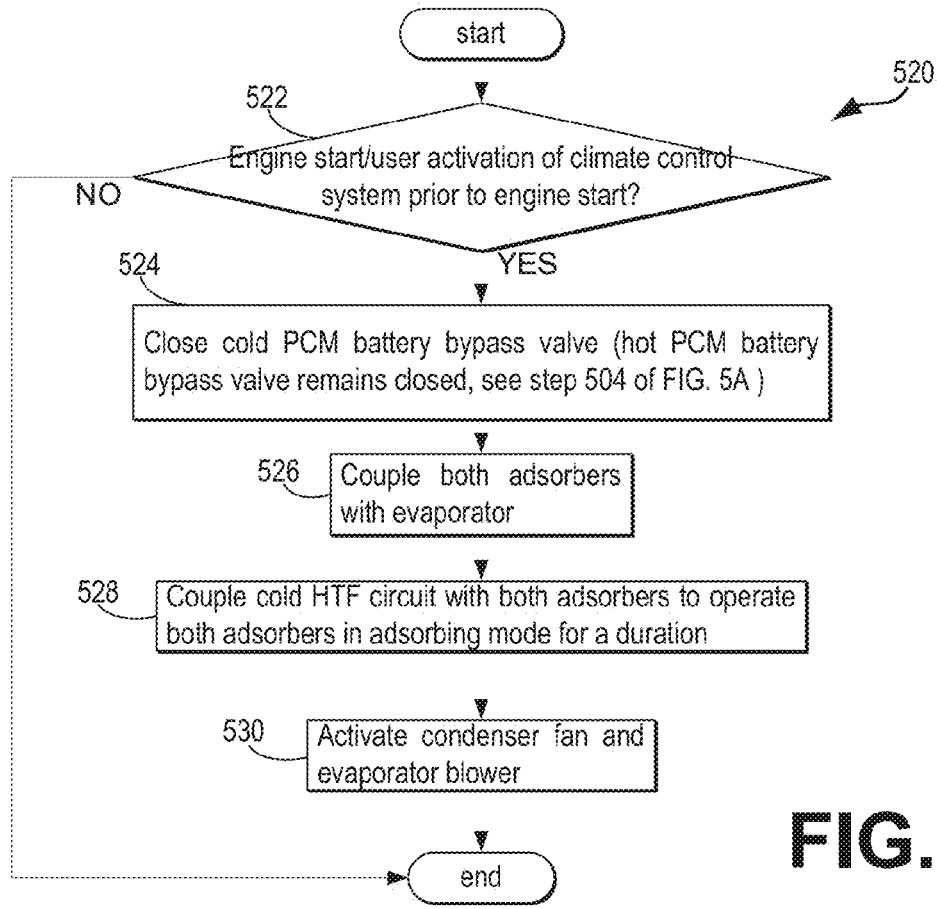
FIG. 5B depicts an example method for operating the climate control system of FIG. 1 at or prior to an engine start in the summer mode to provide surge cooling to the passenger cabin.
Figure 8:
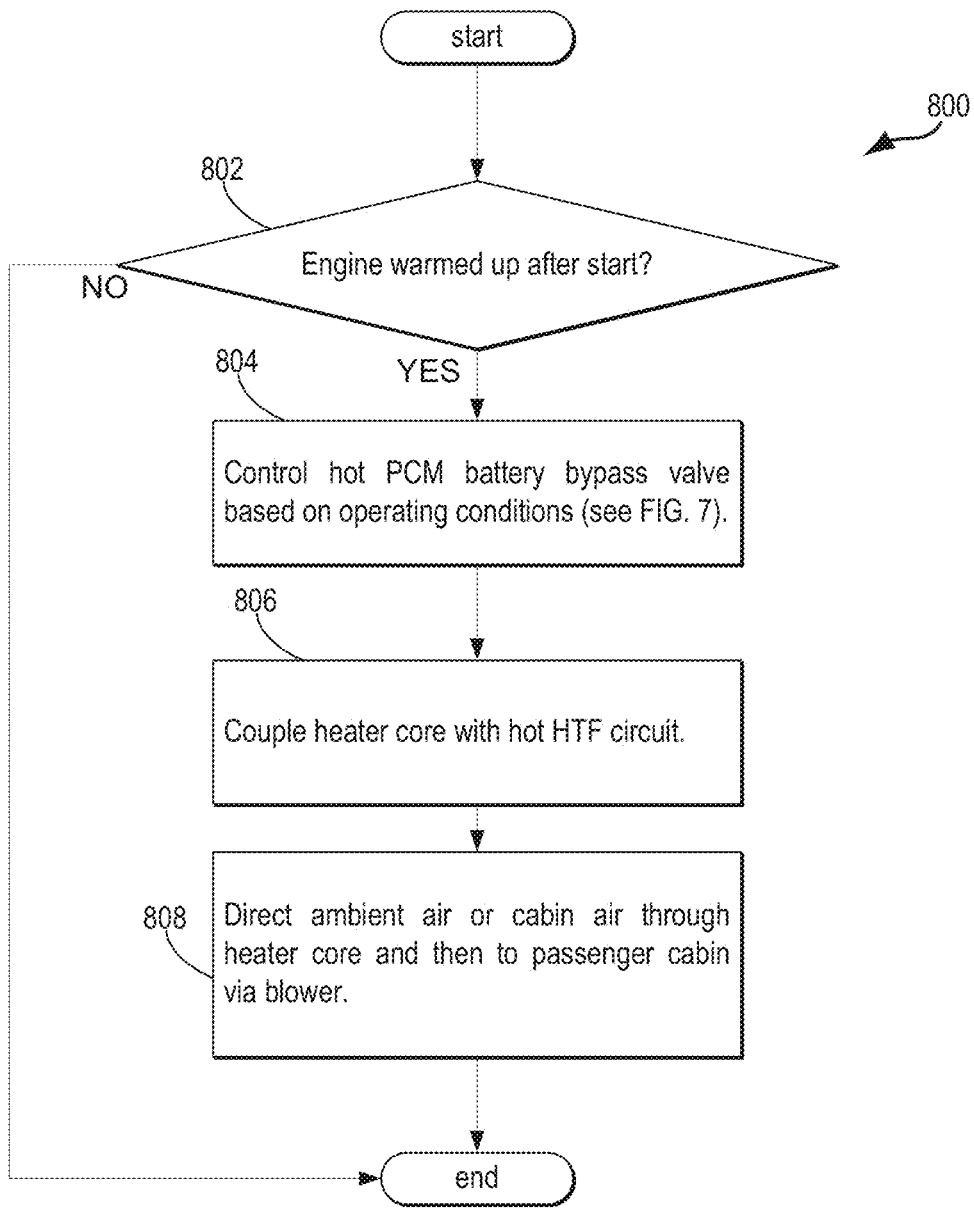
FIG. 8 depicts an example method for operating the climate control system of FIG. 1 in a winter mode after the engine has warmed up from an engine start.
Figure 9:
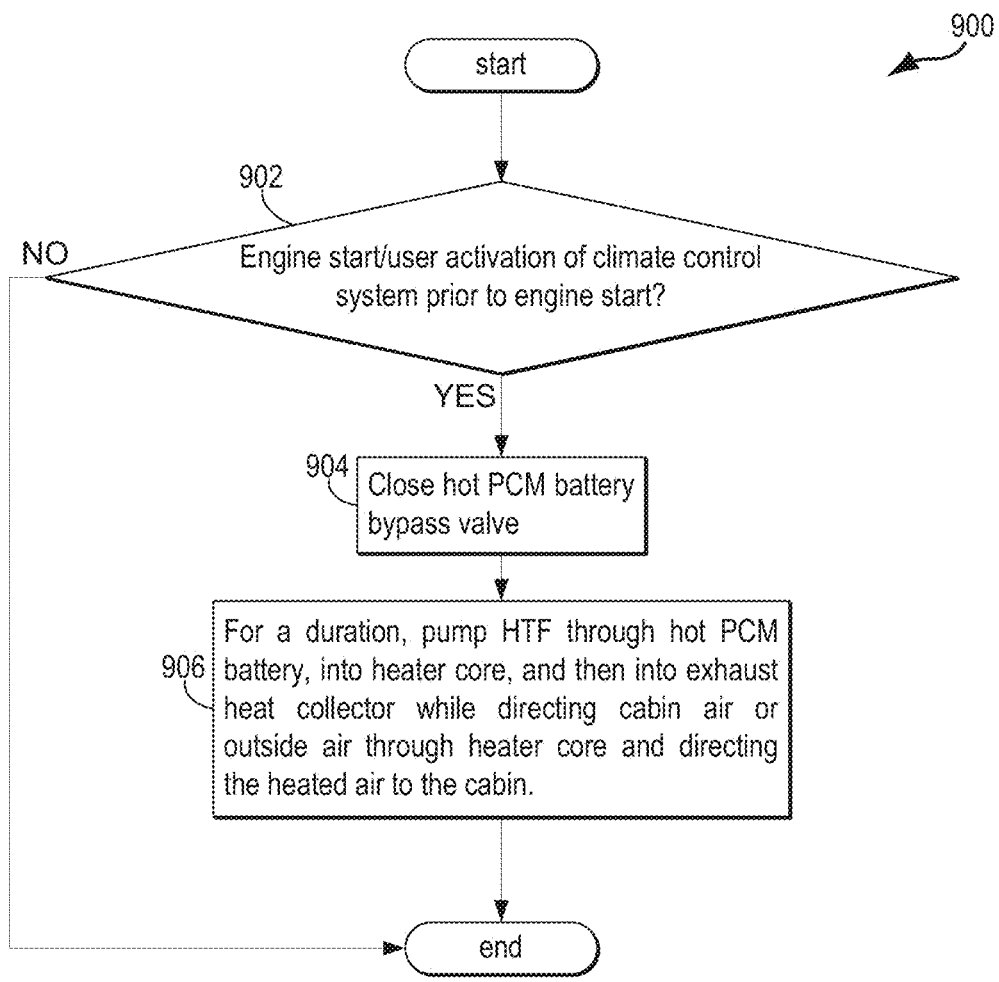
FIG. 9 depicts an example method for operating the climate control system of FIG. 1 in the winter mode at or prior to an engine start in the winter mode to provide surge heating to the passenger cabin.

The climate control system may include two adsorbers, which may be used during summer mode operation but not during winter mode operation. As shown in FIGS. 2A-2B, depending on a temperature of HTF flowing through pipes in each adsorber, an adsorbent in an enclosure of each adsorber may adsorb or desorb refrigerant. The two adsorbers may operate asynchronously and cyclically, as shown, such that one adsorber is in an adsorbing mode with HTF from a cold HTF circuit flowing therethrough, while the other adsorber is in a desorbing mode with HTF from a hot HTF circuit flowing therethrough. As shown in FIG. 3, the hot HTF circuit may include a heat collector wherein engine exhaust heat is transferred to HTF, a hot PCM battery where exhaust heat is stored in PCM, a pump, and a heater core which may be decoupled during summer mode operation, and the cold HTF circuit may include an HTF cooler and a pump. As further shown in FIG. 3, a refrigerant circuit may include the two adsorbers along with an evaporator, condenser, cold PCM battery, and expansion valve. An example method for operation of the climate control system in summer mode is shown in FIG. 4, and an example method for operation of the climate control system in winter mode is shown in FIG. 8. FIGS. 5A and 5B depict methods for operating the climate control system at engine shutdown and at or prior to a subsequent engine start to provide surge cooling to the cabin, whereas FIG. 9 depicts a method for operating the climate control system at or prior to an engine start to provide surge heating to the cabin.

Turning now to FIG. 1, an example embodiment of a vehicle climate control system 100 in a motor vehicle 102 is illustrated schematically. Vehicle 102 includes drive wheels 106, a passenger cabin 104, and an internal combustion engine 108. Internal combustion engine 108 includes a combustion chamber (not shown) which may receive intake air via an intake passage (not shown) and may exhaust combustion gases via exhaust passage 110. Engine 108 may be included in a motor vehicle such as a road automobile, among other types of vehicles.

Unlike some vehicle climate control systems which may circulate coolant through the engine to absorb waste engine heat and distribute the heated coolant to a radiator and/or heater core via coolant lines, climate control system 100 may not fluidly communicate with engine 108. Further, climate control system 100 may include two adsorbers which are driven by thermal energy from engine exhaust rather than by an engine crankshaft or electrical motor. Accordingly, the only coordination between engine 108 and climate control system 100 may be the routing of the engine exhaust in exhaust passage 110 through an exhaust heat collector of climate control system 100, as will be detailed below. In this way, engine 108 may be largely freed from providing climate control in the vehicle, and climate control system 100 may not exert a load on engine 108. Further, as engine coolant may not circulate through climate control system 100, the volume of coolant in the engine may be reduced. Some advantages of a reduced volume of engine coolant include quicker engine warm-up and thus reduced cold start emissions, for example.

FIG. 1 further shows a control system 114 of vehicle 102. Control system 114 may be communicatively coupled to various components of engine 108 and climate control system 100 to carry out the control routines and actions described herein. As shown in FIG. 1, control system 114 may include an electronic digital controller 112. Controller 112 may be a microcomputer, including a microprocessor unit, input/output ports, an electronic storage medium for executable programs and calibration values, random access memory, keep alive memory, and a data bus.

As depicted, controller 112 may receive input from a plurality of sensors 116, which may include user inputs and/or sensors (such as transmission gear position, transmission clutch position, gas pedal input, brake input, transmission selector position, vehicle speed, engine speed, mass airflow through the engine, ambient temperature, intake air temperature, etc.), climate control system sensors (such as HTF temperature, antifreeze temperature, adsorbent temperature, fan speed, passenger compartment temperature, desired passenger compartment temperature, ambient humidity, etc.), and others. As shown in FIG. 1, sensors 116 may include a fob sensor 120 configured to receive input from electronic fob 122. Specifically, fob sensor 120 may remotely couple the vehicle 102 to electronic fob 122, thereby enabling remote control of certain functions of vehicle 102. In one example, electronic fob 122 may remotely activate climate control system 100 so as to pre-condition cabin air. Depending on ambient conditions, for example as sensed by one or more of sensors 116, and/or user input, electronic fob 122 may remotely activate climate control system 100 to provide surge cooling or surge heating of cabin air prior to engine start, as will be detailed herein. Thus, a future vehicle operator or passenger may use electronic fob 122 to ensure that a desired cabin temperature will be present when they enter the vehicle.

In addition to enabling remote activation of climate control system 100, electronic fob 122 may enable a remote keyless entry into vehicle 102. In this case, fob sensor 120 may be further configured to provide an indication to controller 112 regarding the locked or unlocked position of vehicle doors.

Further, controller 112 may communicate with various actuators 118, which may include engine actuators (such as fuel injectors, an electronically controlled intake air throttle plate, spark plugs, transmission clutches, etc.), climate control system actuators (such as air handling vents and/or diverter valves, valves controlling the flow of HTF, valves controlling flow of refrigerant, blower actuators, fan actuators, pump actuators, etc.), and others. In some examples, the storage medium may be programmed with computer readable data representing instructions executable by the processor for performing the methods described below as well as other variants that are anticipated but not specifically listed.

As described above, climate control system 100 includes two structurally identical adsorbers which may operate asynchronously (one adsorber adsorbs while the other desorbs during operating modes other than the surge cooling mode described herein) and cyclically (each adsorber periodically switches between adsorbing mode and desorbing mode). The adsorbers may be driven by engine exhaust heat during summer mode operation of the climate control system to effect evaporation and condensation of refrigerant at an evaporator and a condenser.

FIG. 2A is a cross-sectional view of an example adsorber 200 in an adsorbing mode, whereas FIG. 2B is a cross-sectional view of adsorber 200 in a desorbing mode. Adsorber 200 may be one of two identical adsorbers included in climate control system 100 of FIG. 1.

Adsorber 200 effects heat exchange between HTF and a chemical adsorbent (e.g. zeolite, silica gel, or activated carbons in powder, pellet, or coating form). In the embodiments described herein, HTF flows through a snaking fin tube 202, and an adsorbent 204 forms a coating on the surface of the fin tube. However, it will be appreciated that another suitable adsorption heat exchanger may be used in the climate control system described herein. For example, rather than a coating, adsorbent 204 could be metal foam, or another suitable type of highly porous metal-organic framework (MOF). Similarly, although a snaking arrangement of a single fin tube 202 is shown, multiple separate tubes may be used to carry HTF through the adsorbers, or HTF may flow through an integral channel of each adsorber, e.g. a channel spanning the circumference of the adsorber.

Fin tube 202 and adsorbent 204 are arranged within an enclosure 206 of adsorber 200. Depending on whether the adsorber is currently in an adsorbing or desorbing mode, a valve 208 may be controlled to direct HTF from either a hot HTF circuit or a cold HTF circuit into fin tube 202. Similarly, based on the current mode of the adsorber, a valve 210 downstream of a pump 226 may be controlled to direct HTF from the fin tube to either the hot HTF circuit or the cold HTF circuit. When adsorber 200 is in the adsorbing mode, as depicted in FIG. 2A, valve 208 is controlled to flow HTF from the cold HTF circuit through the adsorber, and valve 210 is controlled to flow HTF from the adsorber back to the cold HTF circuit. In contrast, when adsorber 200 is in the desorbing mode, as depicted in FIG. 2B, valve 208 is controlled to flow hot HTF from the hot HTF circuit through the adsorber, and valve 210 is controlled to flow HTF from the adsorber back to the hot HTF circuit. The hot and cold HTF circuits will be described further with respect to FIG. 3.

Depending on the temperature of the HTF flowing through adsorber 200, refrigerant may be adsorbed at or desorbed from the adsorbent. The refrigerant may be water, ammonia, R1234f, or any other suitable refrigerant. During an adsorbing mode, as shown in FIG. 2A, the controller controls valve 208 to flow cold HTF through snaking fin tube 202 in enclosure 206 to cool adsorbent 204. The cooling of adsorbent 204 creates suction, which draws in refrigerant from an evaporator fluidly communicating with enclosure 206 when valve 220 is in an open state, as will be detailed below with respect to FIG. 3. A desorbing mode may be performed after the adsorbing mode, wherein refrigerant from the evaporator that was adsorbed by the adsorbent is desorbed and routed to a condenser. During the desorbing mode, as shown in FIG. 2B, the controller controls valve 208 to flow hot HTF through fin tube 202, to heat adsorbent 204. The heating of the adsorbent effects desorption of refrigerant from the adsorbent. When valve 220 is in an open state, the desorbed refrigerant may be directed to a condenser fluidly communicating with enclosure 206, as will be detailed below with respect to FIG. 3.

As described above, the adsorbers may asynchronously alternate between adsorbing and desorbing modes while the engine is running. One cycle of operation of the adsorbers may refer to a duration during which each adsorber has operated in both the adsorbing and desorbing modes. In one example, a cycle lasts 20-40 minutes, and a half-cycle lasts 10-20 minutes. For example, during a first half-cycle, a first adsorber may operate in the adsorbing mode while the second adsorber operates in the desorbing mode. During a second half-cycle immediately following the first half-cycle, the first adsorber may operate in the desorbing mode while the second adsorber operates in the adsorbing mode. The thermal-adsorption air-conditioning system may repeat this cycle throughout operation of the climate control system, with the exception of certain climate control system operating modes (e.g., the surge cooling mode described herein) which utilize adsorption or desorption at both adsorbers simultaneously.

At engine shutdown during summer mode operation, it may be desirable to fully desorb refrigerant from the adsorbents of both adsorbers. In this way, the climate control system may be operated in a surge cooling mode at the next engine start. For example, at engine shutdown during the summer mode, at both adsorbers, the controller may control valve 208 to flow hot HTF through fin tube 202 to heat adsorbent 204 and thereby effect desorption of refrigerant from the adsorbent. Although the hot HTF circuit is not receiving heat from engine exhaust at this time due to the engine being shut down, hot HTF may be discharged from a hot PCM battery in the hot HTF circuit to desorb the adsorbents of both adsorbers. After desorbing the adsorbents of both adsorbers, the controller may control valve 220 to be in a closed position at both adsorbers, thereby isolating the refrigerant circuit from the adsorber enclosures to prevent refrigerant vapor from re-entering the adsorbers while the engine is shut down (e.g., while the vehicle is parked). Desorbing the adsorbents of both adsorbers at engine shutdown enables both adsorbers to be operated in the adsorbing mode for a duration (e.g., 2 to 5 minutes) when the engine is started up again. Operating both adsorbers in the adsorbing mode may effectively double the cooling power (relative to operation with only one adsorber in the adsorbing mode) so as to allow for immediate delivery of cold air for increased passenger comfort (and for other ancillary engine/vehicle cooling needs) during warm weather conditions. In some embodiments, a surge cooling mode may commence prior to engine start up. For example, a user may remotely activate the climate control system prior to starting the engine, for example via electronic fob 122 shown in FIG. 1, which may in turn activate the surge cooling mode (e.g., during warm weather conditions). The surge cooling mode will be described further with respect to FIGS. 5A and 5B.

FIG. 3 schematically depicts an example climate control system 300. Climate control system 300 may be incorporated in vehicle 102 of FIG. 1, and may include two identical adsorbers: a first adsorber 302 and a second adsorber 304. First and second adsorbers 302 and 304 may include the structure of adsorber 200 shown in FIGS. 2A and 2B, and may be operated asynchronously and cyclically in the manner described above for adsorber 200. Climate control system 100 may further include two working fluids, refrigerant and HTF. Climate control system 100 may be operated in a summer mode (e.g., during hot weather conditions) and a winter mode (e.g., during cold weather conditions).

I. Summer Mode Operation

During summer mode operation, adsorbers 302 and 304 in conjunction with hot and cold HTF circuits and a refrigerant circuit provide cooling to the passenger cabin. As shown in FIG. 3, heating and cooling of the adsorbers in adsorbers 302 and 304 may be provided by a hot HTF circuit 306 and a cold HTF circuit 308, respectively. The HTF flowing in hot and cold HTF circuits 306 and 308 may be any suitable HTF with a high boiling point which may be used in both high-temperature applications (e.g., heat exchange with high-temperature engine exhaust) and low-temperature applications (e.g., during severe winter conditions). In one example, the HTF in hot and cold HTF circuits 306 and 308 may be a petroleum-based HTF.

Hot HTF circuit 306 enables desorption by heating HTF that is circulated by a pump 310 between an exhaust heat collector 312, a hot PCM battery 314, and first and second adsorbers 302 and 304 of thermal-adsorption air-conditioning system 324. As shown in FIG. 3, exhaust heat collector 312 is coupled with an engine exhaust pipe 316. HTF may flow through exhaust heat collector 312, and heat from the engine exhaust flowing through pipe 316 at exhaust heat collector 312 may be transferred to the HTF flowing therethrough.

Hot PCM battery 314 may be arranged downstream of heat collector 312. Hot PCM battery 314 may store thermal energy in one or more types of PCM to enable thermal energy storage in the 125 to 250° C. range. The PCM may absorb thermal energy when changing state from solid to liquid, and release thermal energy when changing state from liquid to solid. Hot PCM battery 314 may be insulated to reduce dissipation of thermal energy stored therein. For example, hot PCM battery 314 may be a thermos-type dual-vessel container enclosing PCM material. The PCM material may be enclosed in a deep vacuum space (e.g., with an absolute pressure of 1 microbar or less) between outer and inner vessels of the hot PCM battery. HTF flowing in hot HTF circuit 306 may enter an inlet of hot PCM battery 314 and exit an outlet of hot PCM battery 314. In one example, the PCM within hot PCM battery 314 may be arranged in one or more PCM stacks supported between retention plates, each stack including a plurality of PCM elements arranged radially about a central feed passage. The HTF entering the inlet of the hot PCM battery may flow through the central feed passage where it may flow radially from the center feed passage to the plurality of PCM elements, to be stored therein. Depending on the type or types of PCM included in hot PCM battery 314, among other factors, hot PCM battery 314 may retain a percentage of thermal energy stored therein during engine operation for a duration after engine shutdown. In one example, 80% of the thermal energy stored in hot PCM battery 314 during engine operation may remain stored for at least 16 hours after engine shutdown. As such, hot PCM battery 314 may supply hot HTF to adsorbers 302 and 304 even while the engine is shut down. For example, hot PCM battery 314 may store 1.0 to 1.5 kWh of energy, which may enable immediate delivery of thermal energy to both adsorbers after engine shutdown to enable the surge cooling mode at the next engine start. The thermal energy storage capacity of the hot PCM battery may depend on a multitude of factors, including the size of the engine, the vehicle, and various climate control system parameters (e.g. passenger compartment size, electric battery in the case of an HEV-type vehicle, etc.). It will be appreciated that thermal energy stored in hot PCM battery 314 may be discharged without starting the engine, e.g. via remote control by a user while the engine is shut down. For example, a user may remotely activate the climate control system prior to starting the engine, for example via electronic fob 122 shown in FIG. 1, which may cause the controller to control climate control system 100 to discharge hot HTF stored in a hot PCM battery for use in the surge cooling mode described below.

Hot PCM battery 314 may be arranged in parallel with a conduit 318 including a bypass valve 320. HTF may flow in conduit 318, thereby bypassing hot PCM battery 314, depending on a position of bypass valve 320. For example, when bypass valve 320 is in a fully closed position, all of the HTF leaving heat collector 312 may flow to hot PCM battery 314, where it may effect storage of heat in PCM. Alternatively, when bypass valve 320 is in a fully open position, all of the HTF leaving heat collector 312 may bypass hot PCM battery 314 and flow through conduit 318. Pump 310 may be arranged downstream of hot PCM battery 314 and bypass valve 320; the controller may control pump 310 to induce HTF flow from heat collector 312 through hot PCM battery 314 and/or conduit 318, depending on the position of bypass valve 320.

Depending on a position of a valve 382 arranged in the hot HTF circuit downstream of pump 310 and a position of a valve 344 arranged in the hot HTF circuit upstream of exhaust heat collector 312, either a heater core 328 or the adsorbers 302 and 304 may be included in hot HTF circuit 306. During summer mode operation, the valves 382 and 344 may be controlled such that adsorbers 302 and 304 are included in hot HTF circuit 306 and heater core 328 is not included in hot HTF circuit 306. Adsorbers 302 and 304 may operate in conjunction with hot HTF circuit 306 and cold HTF circuit 308 to provide cooling to the passenger cabin. Cold HTF circuit 308 may enable adsorption by cooling HTF that is circulated by a pump 322 between the currently adsorbing adsorber and an HTF cooler 326. HTF cooler 326 may be any suitable device which can maintain HTF temperature within a desired range (e.g., 30 to 40° C.). For example, HTF cooler 326 may be an air-to-liquid heat exchanger. A fan 374 may direct ambient air across HTF cooler 326 to effect heat transfer between HTF flowing therethrough and the ambient air, thereby cooling the HTF. As shown in FIG. 3, pump 322 is arranged downstream of HTF cooler 326. Cold HTF circuit 308 may fluidly communicate with adsorbers 302 and 304 downstream of pump 322, as will be described below.

Further, during summer mode operation, hot HTF circuit 306 and cold HTF circuit 308 may selectively communicate with adsorbers 302 and 304 depending on the positions of various valves. When valve 382 is controlled such that the adsorbers are coupled with the hot HTF circuit, a position of a hot HTF delivery valve 330 arranged downstream of pump 310 and valve 382 may determine whether the hot HTF circuit communicates with one, both, or none of first and second adsorbers 302 and 304. Similarly, a position of a cold HTF delivery valve 340 arranged downstream of pump 322 in the cold HTF circuit may determine whether the cold HTF circuit communicates with one, both, or none of first and second adsorbers 302 and 304. First adsorber 302 includes a first HTF inlet valve 332, and second adsorber 304 includes a second HTF inlet valve 334. Valve 332 communicates with the hot HTF circuit, the cold HTF circuit, and the first adsorber, whereas valve 334 communicates with the hot HTF circuit, the cold HTF circuit, and the second adsorber. Valves 332 and 334 may perform the same function as valve 208 of FIGS. 2A and 2B; for example, depending on whether the first adsorber is currently in an adsorbing or desorbing mode, the first HTF inlet valve may be controlled to allow communication between either the hot HTF circuit or the cold HTF circuit and the first adsorber. Based on the position of valve 332, HTF from the hot HTF circuit, HTF from the cold HTF circuit, or no HTF may enter the first adsorber. Likewise, based on the position of valve 334, HTF from the hot HTF circuit, HTF from the cold HTF circuit, or no HTF may enter the second adsorber.

While the engine is running (e.g., after the engine has warmed up after being started and before the engine has been shut down), valves 330, 332, 334, and 340 may cooperate to direct HTF from the hot and/or cold HTF circuits to the appropriate adsorber(s) during a given operating mode of each adsorber. For example, while the first adsorber is adsorbing and the second adsorber is desorbing, the controller may control the position of valve 330 to direct hot HTF flow to the second adsorber but not the first adsorber, while controlling the position of valve 340 to direct cold HTF flow to the first adsorber but not the second adsorber. The controller may further control a position of valves 332 and 334 such that HTF from the hot HTF circuit may enter the second adsorber and HTF from the cold HTF circuit may enter the first adsorber. Then, after a duration which will be referred to herein as a half-cycle of the thermal-adsorption air-conditioning system, the first and second adsorbers will switch such that the second adsorber is adsorbing and the first adsorber is desorbing. To effect the switch, the controller may control the position of valve 330 to direct hot HTF flow to the first adsorber but not the second adsorber, while controlling the position of valve 340 to direct cold HTF flow to the second adsorber but not the first adsorber. The controller may further control a position of valves 332 and 334 such that HTF from the cold HTF circuit may enter the second adsorber and HTF from the hot HTF circuit may enter the first adsorber. After another half-cycle has elapsed, the first and second adsorbers may switch again such that the second adsorber is desorbing and the first adsorber is adsorbing. The first and second adsorbers may switch between adsorbing and desorbing modes in this way throughout operation of the climate control system while the engine is running.

In contrast, at engine shutdown and prior to or at engine start, the controller may control the positions of valves 330, 332, 334, and 340 differently in preparation for the surge cooling mode. For example, at engine shutdown during warm weather conditions, the controller may control the valves such that desorption occurs at both adsorbers. For example, the controller may control valve 330 to direct hot HTF flow to both adsorbers, and may further control the positions of valves 332 and 334 to communicate both the first and second adsorbers with the hot HTF circuit. As described above with respect to FIGS. 2A and 2B, after this operation, each adsorber enclosure may be isolated from the associated refrigerant circuit to prevent refrigerant vapor from re-entering the adsorbers while the engine is off (e.g., while the vehicle is parked). Then, at the next engine start (or prior to the next engine start), the controller may recouple the refrigerant circuit with each adsorber enclosure, and then control the valves such that adsorption occurs at both adsorbers. For example, the controller may control valve 340 to direct cold HTF flow to both adsorbers, and may further control the positions of valves 332 and 334 to communicate both the first and second adsorbers with the cold HTF circuit.

As described above with respect to FIG. 2, based on the current mode of each adsorber, a valve downstream of a pump is controlled to direct HTF from the fin tube(s) of that adsorber to either the hot HTF circuit or the cold HTF circuit. As shown in FIG. 3, a first HTF outlet valve 348 is arranged downstream of a first HTF outlet pump 352 at an HTF outlet of first adsorber 302, and a second HTF outlet valve 350 is arranged downstream of second HTF outlet pump 354 at an HTF outlet of second adsorber 304. Like pump 226 shown in FIGS. 2A and 2B, pumps 352 and 354 may pump HTF from fin tubes of the first and second adsorbers, respectively, to the hot HTF circuit or the cold HTF circuit, depending on positions of valves 348 and 350 as well as positions of a hot HTF return valve 344 and a cold HTF return valve 346.

For example, when the first adsorber is in adsorbing mode and the second adsorber is in desorbing mode, the controller may control the positions of valves 344, 346, 348, and 350 such that HTF leaving the first adsorber returns to the cold HTF circuit and HTF leaving the second adsorber returns to the hot HTF circuit. Similarly, when the first adsorber is in desorbing mode and the second adsorber is in adsorbing mode, the controller may control the positions of valves 344, 346, 348, and 350 such that HTF leaving the first adsorber returns to the hot HTF circuit and HTF leaving the second adsorber returns to the cold HTF circuit. It will be appreciated that when hot HTF flows through both of the adsorbers, for example after engine shutdown during the surge cooling mode described herein, valve 344 may be controlled such that hot HTF from both adsorbers is directed back to the hot HTF circuit (e.g., upstream of heat collector 312 as shown in FIG. 3). Similarly, it will be appreciated that when cold HTF flows through both of the adsorbers, for example at or prior to engine start during the surge cooling mode, valve 346 may be controlled such that cold HTF from both adsorbers is directed back to the cold HTF circuit (e.g., upstream of HTF cooler 326 as shown in FIG. 3).

As shown in FIG. 3, climate control system 300 further includes a refrigerant circuit 356. Refrigerant circuit 356 operates in conjunction with the cooling or heating of the adsorbents within adsorbers 302 and 304 via the cold and hot HTF circuits to provide cooled air to the cabin. Refrigerant circuit 356 includes first and second adsorbers 302 and 304 along with an evaporator 358, cold PCM battery 360, thermal expansion valve 362, and condenser 364.

Cold PCM battery 360 may store thermal energy in one or more types of PCM to enable thermal energy storage in the 3 to 10° C. range. The PCM may absorb thermal energy when changing state from solid to liquid and release thermal energy when changing state from liquid to solid. Cold PCM battery 360 may be insulated to reduce dissipation of thermal energy stored therein. For example, cold PCM battery 360 may be a thermos-type dual-vessel container enclosing PCM material. The PCM material may be enclosed in a deep vacuum space (e.g., with an absolute pressure of 1 microbar or less) between outer and inner vessels of the cold PCM battery. Refrigerant flowing in refrigerant circuit 356 may enter an inlet of cold PCM battery 360 and exit an outlet of cold PCM battery 360. In one example, the PCM within cold PCM battery 360 may be arranged in one or more PCM stacks supported between retention plates, each stack including a plurality of PCM elements arranged radially about a central feed passage. The refrigerant entering the inlet of the cold PCM battery may flow through the central feed passage where it may flow radially from the center feed passage to the plurality of PCM elements, to be stored therein. Depending on the type or types of PCM included in cold PCM battery 360, among other factors, cold PCM battery 360 may retain a percentage of the thermal energy stored therein during engine operation for a duration after engine shutdown. In one example, 80% of the thermal energy stored in cold PCM battery 360 during engine operation may remain stored for at least 16 hours after engine shutdown. As such, cold PCM battery 360 may supply cold refrigerant to evaporator 358 even while the engine is shut down. For example, cold PCM battery 360 may store 1.0 to 1.5 kWh of energy, which may enable immediate delivery of thermal energy to evaporator 358 to enable a surge cooling mode at the next engine start. The thermal energy storage capacity of the cold PCM battery may depend on a multitude of factors, including the size of the engine, the vehicle, and various climate control system parameters (e.g. passenger compartment size, electric battery in the case of an HEV-type vehicle, etc.).

The thermal energy storage capacity of the cold PCM battery may enable it to meet surge cooling requirements to ensure passenger comfort at engine start despite the small size of the cold PCM battery, e.g. relative to a pressurized $NH_3$ reservoir. Further, the increased thermal energy capacity of the cold PCM battery, e.g. relative to a pressurized $NH_3$ reservoir, enables downsizing of the adsorbers used for cabin cooling, thereby improving the efficiency of the climate control system and making it more packagable.

It will be appreciated that thermal energy stored in cold PCM battery 360 may be discharged without starting the engine, e.g. via remote control by a user while the engine is shut down. For example, a user may remotely activate the climate control system prior to starting the engine, for example via electronic fob 122 shown in FIG. 1, which may cause the controller to control climate control system 100 to discharge cold refrigerant stored in cold PCM battery 360 for use in a surge cooling mode.

Cold PCM battery 360 may be arranged in parallel with a conduit 372 including a bypass valve 370. Refrigerant may flow in conduit 372, thereby bypassing cold PCM battery 360, depending on a position of bypass valve 370. For example, when bypass valve 370 is in a fully closed position, all of the refrigerant leaving thermal expansion valve 362 may flow to cold PCM battery 360, where it may effect storage of thermal energy in PCM. Alternatively, when bypass valve 370 is in a fully open position, all of the refrigerant leaving thermal expansion valve 362 may bypass cold PCM battery 360 and flow through conduit 372.

Evaporator 358 and condenser 364 may selectively communicate with adsorbers 302 and 304 depending on the positions of various valves. A position of an adsorbed refrigerant valve 378 may determine whether refrigerant from evaporator 358 may be adsorbed at the adsorbent(s) of one, both, or none of first and second adsorbers 302 and 304. Similarly, a position of a desorbed refrigerant valve 380 may determine whether refrigerant desorbed from the adsorbent of one, both, or none of first and second adsorbers 302 and 304 may condense at condenser 364. During a given operating mode of each adsorber, valves 378 and 380 may cooperate to direct refrigerant from evaporator 358 to the appropriate adsorber(s), and to direct refrigerant from the appropriate adsorber(s) to condenser 364, as described below.

In conjunction with the other components and circuits of climate control system 300, refrigerant circuit 356 may provide cooling to a passenger cabin in the following manner.

During a first half-cycle of operation of adsorbers 302 and 304, first adsorber 302 is in adsorbing mode, and second adsorber 304 is in desorbing mode. As such, first adsorber 302 communicates with the cold HTF circuit, whereas second adsorber 304 communicates with the hot HTF circuit. Because it is operating in the desorbing mode, the second adsorber 304 is desorbing refrigerant. The controller controls valve 380 to communicate the enclosure of the second adsorber alone with the condenser. The refrigerant desorbed from second adsorber 304 condenses at condenser 364 and gives off heat to ambient air being directed through the condenser by a fan 368 coupled with the condenser. Rejecting heat to ambient air cools the hot liquid refrigerant at the condenser. The liquid refrigerant then passes through thermal expansion valve 362, which meters the flow of liquid refrigerant and thus provides further cooling of the liquid refrigerant (e.g., by lowering the pressure of the liquid refrigerant). The liquid refrigerant metered by the thermal expansion valve then flows into cold PCM battery 360 (e.g., storing thermal energy in PCM in the battery) and/or bypasses cold PCM battery 360 via conduit 372, depending on an opening state of bypass valve 370. Meanwhile, adsorption at the first adsorber (which is operating in the adsorbing mode) creates suction. The controller controls valve 378 to communicate the enclosure of the first adsorber alone with evaporator 358, and the suction at the first adsorber induces flow of liquid refrigerant from cold PCM battery 360 and/or conduit 372 into evaporator 358 which is arranged downstream of cold PCM battery 360 and conduit 372. The liquid refrigerant vaporizes inside evaporator 358 before flowing into the enclosure of the first adsorber where it is adsorbed at the adsorbent of the first adsorber. The vaporization of the refrigerant cools outside air pushed through the evaporator and into the passenger cabin by a blower 366, thereby cooling the passenger cabin.

In contrast, during a second half-cycle of operation of adsorbers 302 and 304, first adsorber 302 is in desorbing mode, and second adsorber 304 is in adsorbing mode. As such, second adsorber 304 communicates with the cold HTF circuit, whereas first adsorber 302 communicates with the hot HTF circuit. Because it is operating in the desorbing mode, the first adsorber 302 is desorbing refrigerant. The controller controls valve 380 to communicate the enclosure of the first adsorber alone with the condenser. The refrigerant desorbed from first adsorber 302 condenses at condenser 364 and gives off heat to ambient air being directed through the condenser by a fan 368 coupled with the condenser. Rejecting heat to ambient air cools the hot liquid refrigerant at the condenser. The liquid refrigerant then passes through thermal expansion valve 362, which meters the flow of liquid refrigerant and thus provides further cooling of the liquid refrigerant (e.g., by lowering the pressure of the liquid refrigerant). The liquid refrigerant metered by the thermal expansion valve then flows into cold PCM battery 360 (thus storing thermal energy in PCM in the battery) and/or bypasses cold PCM battery 360 via conduit 372, depending on an opening state of bypass valve 370. Meanwhile, adsorption at the second adsorber (which is operating in the adsorbing mode) creates suction. The controller controls valve 378 to communicate the enclosure of the second adsorber alone with evaporator 358, and the suction at the second adsorber induces flow of liquid refrigerant from cold PCM battery 360 and/or conduit 372 into evaporator 358 which is arranged downstream of cold PCM battery 360 and conduit 372. The liquid refrigerant vaporizes inside evaporator 358 before flowing into the enclosure of the second adsorber where it is adsorbed at the adsorbent of the second adsorber. The vaporization of the refrigerant cools outside air pushed through the evaporator and into the passenger cabin by a blower 366, thereby cooling the passenger cabin. Accordingly, during the second half-cycle, the routing of refrigerant is reversed relative to the first half-cycle.

In one example, each cycle lasts 20-40 minutes, and each half-cycle lasts 10-20 minutes. After the second half-cycle, the climate control system begins a subsequent operation cycle by operating in accordance with the first half-cycle, and the continues to alternate between the first and second half-cycles while the engine is on and the climate control system is operating in summer mode.

II. Winter Mode Operation

During winter mode operation, a heater core is coupled with the hot HTF circuit to provide heating to the passenger cabin, whereas adsorbers 302 and 304 and refrigerant circuit 356 are not used for cabin heating. The controller controls valves 382 and 344 such that heater core 328 is included in hot HTF circuit 306 and adsorbers 302 and 304 are not included in hot HTF circuit 306. For example, the controller may control valve 382 to direct all HTF leaving pump 310 to heater core 328, and the controller may control valve 344 to direct only HTF leaving heater core 328 to exhaust heat collector 312. Further, a blower 376 may direct air (e.g., outside air or cabin air) through heater core 328 for heating, and then to the passenger cabin to provide heating.

While the engine is running (e.g., after the engine has warmed up after being started and before the engine has been shut down), engine exhaust heat may sufficiently heat the HTF in hot HTF circuit 306, and thus bypass valve 320 may be opened such that HTF bypasses hot PCM battery 314. In one example, bypass valve 320 may be fully opened once hot PCM battery 314 achieves a full charge of thermal energy. In another example, bypass valve 320 may be partially opened throughout engine operation such that some HTF bypasses the hot PCM battery while some HTF charges the hot PCM battery.

In contrast, during a surge heating mode initiated prior to or at engine start, heat may be provided by the hot PCM battery instead of or in addition to engine exhaust heat. The surge heating mode may be activated prior to or at engine start. For example, a user may remotely activate the climate control system prior to starting the engine, for example via electronic fob 122 shown in FIG. 1, which may cause the controller to control climate control system 100 to discharge hot HTF stored in hot PCM battery 314 for immediate delivery of thermal energy to the heater core. As described above, hot PCM battery 314 may store 1.0 to 1.5 kWh of energy, which may enable delivery of heat to the heater core before engine start or at engine start (e.g., when exhaust heat may not be available to heat HTF in the hot HTF circuit). The surge heating mode will be detailed below with respect to FIG. 9.

FIG. 4 shows an example method 400 for operation of a climate control system (e.g. climate control system 100 shown in FIG. 1) in the summer mode described herein. For example, the climate control system may be operated in accordance with method 400 when a currently sensed ambient temperature is greater than a first threshold, or when a mean temperature determined based on a record of sensed ambient temperature values is greater than the first threshold. Alternatively, summer mode operation may be selected via user prior to or at engine start, for example via electronic fob 122 of FIG. 1. For example, the user may select a desired mode from among summer and winter modes, air-conditioning and heating modes (where air-conditioning mode may correspond to summer mode and heating mode may correspond to winter mode), or the user may select a desired temperature (which the climate control system may translate into summer or winter mode operation depending on its value). In another example, the user may activate the climate control system without indicating a desired mode or temperature, e.g. via an electronic fob, and the control system may determine an appropriate mode of operation based on ambient conditions.

At 402, method 400 includes determining whether the engine has warmed up after engine start. The determination may be based on whether a predetermined duration has elapsed since engine start, sensed temperatures (e.g. exhaust pipe temperature, engine coolant temperature, etc.), a number of combustion cycles performed since engine start, etc.

If the answer at 402 is NO, the engine has not yet warmed up after engine start, method 400 ends. Operation of the climate control system prior to engine warm up (e.g., at or prior to engine start and after engine shutdown) will be described herein with respect to the method of FIGS. 5A and 5B for summer mode operation.

Otherwise, if the answer at 402 is YES, method 400 continues to 404. At 404, method 400 includes controlling the cold PCM battery bypass valve and hot PCM battery bypass valve based on operating conditions. Routines for controlling these valves are provided in FIGS. 6 and 7. For example, the bypass valves for each PCM battery may be controlled based on a state of charge of the battery, whether required cabin cooling can be provided by the adsorbers alone, whether required heating of HTF in the hot HTF circuit can be provided by heat exchange with engine exhaust alone, etc.

After 404, method 400 continues to 406. At 406, method 400 includes coupling the fin tube(s) of the adsorbing adsorber with the cold HTF circuit, and coupling the fin tube(s) of the desorbing adsorber with the hot HTF circuit. Fins of the fin tube(s) may extend into the adsorbent, and may assist with heat transfer between HTF flowing within the fin tube(s) and the adsorbent. Accordingly, coupling the fin tube(s) of the adsorbing adsorber with the cold HTF circuit effectively cools the adsorbent of that adsorber, whereas coupling the fin tube(s) of the desorbing adsorber with the hot HTF circuit effectively heats the adsorbent of that adsorber. It will be appreciated that the terms "adsorbing adsorber" and "desorbing adsorber" are used to differentiate between the adsorber which is operating in adsorbing mode (coupled with the cold HTF circuit) and the adsorber which is operating in desorbing mode (coupled with the hot HTF circuit) during a current half-cycle of the climate control system operation.

After 406, method 400 continues to 408. At 408, method 400 includes coupling the enclosure of the desorbing adsorber with the condenser and directing ambient air through the condenser and back to ambient via a fan. Further, at 408, method 400 includes coupling the enclosure of the adsorbing adsorber with the evaporator and directing ambient air through the evaporator and into the passenger cabin via a blower. As described above for FIG. 3, cooling of the adsorbent of the adsorbing adsorber creates suction, and the suction pumps vaporized refrigerant from the evaporator into the enclosure of the adsorbing adsorber, where it is adsorbed at the adsorbent. Further, heating of the adsorbent of the desorbing adsorber causes desorption of refrigerant from the adsorbent, and the desorbed refrigerant flows into the condenser where it condenses. The cooling effect due to evaporation of refrigerant at the evaporator is harnessed to provide cooled air to the cabin via the blower, whereas the heating effect due to condensation of refrigerant at the condenser is harnessed to reject heat to ambient, thereby cooling refrigerant in the refrigerant circuit.

After 408, method 400 continues to 410. At 410, method 400 includes determining whether engine shutdown has been initiated. The determination may be made based on sensed parameter values such as ignition state, in one example. If the answer at 410 is YES, method 400 proceeds to 416. At 416, method 500 (depicted in FIG. 5A and described below) is performed, starting at step 504. After 416, method 400 ends.

Otherwise, if the answer at 410 is NO indicating that engine shutdown has not been initiated, method 400 continues to 412. At 412, method 400 includes determining whether a half-cycle of operation of the climate control system has completed. For example, the determination may be made based on whether a predetermined duration has elapsed since the beginning of the cycle. Alternatively, the determination may be made based on sensed values of parameters associated with the adsorbers such as a volume of refrigerant adsorbed by the adsorbing adsorber, a volume of refrigerant condensed at the condenser, etc.

If the answer at 410 is NO, method 400 returns to 410 and adsorption and desorption continue at the adsorbers until either engine shutdown is initiated or a positive determination is made at 412. For example, the controller may check whether engine shutdown has been initiated and whether a half-cycle of the climate control system has completed intermittently, or an interrupt may be generated when engine shutdown has been initiated or when a half-cycle of the climate control system has completed.

Otherwise, if the answer at 412 is YES, method 400 continues to 414 to switch the modes of the adsorbers. Switching the modes of the adsorbers may involve changing the positions of valves coupling the HTF circuits with the adsorbers, as the current mode (i.e., adsorbing or desorbing) of an adsorber may be based on whether hot or cold HTF is flowing through the fin tube(s) of the adsorber. For example, at 412, the controller may control valves such as valves 330, 332, 334, 340, 344, 346, 348, and 350 of FIG. 3 to decouple the cold HTF circuit from the adsorber which was adsorbing during the first half-cycle, and couple the hot HTF circuit with that adsorber such that it switches to desorbing mode. At the same time, the controller may control the valves to decouple the hot HTF circuit from the adsorber which was desorbing during the first half-cycle, and couple the cold HTF circuit with that adsorber such that it switches to adsorbing mode. Thus, the switching of modes results in the adsorbing adsorber of the first half-cycle becoming the desorbing adsorber of the next half-cycle, and the desorbing adsorber of the first half-cycle becoming the adsorbing adsorber of the next half-cycle.

After 414, method 400 returns to 406. The climate control system may repeat the routine of steps 406 to 412 throughout operation of the climate control system in summer mode while the engine is operating. In contrast, at engine shutdown and at or prior to engine start, the climate control system may be operated in accordance with the method shown in FIG. 5A and described below.

FIG. 5A shows an example method 500 for operation of a climate control system (e.g. climate control system 100 shown in FIG. 1) in summer mode after engine shutdown, to prepare for providing surge cooling to the passenger cabin at or prior to a subsequent engine start. As shown in FIG. 4, method 500 may be performed after engine shutdown has been initiated during summer mode operation of the climate control system.

At 502, method 500 includes determining whether engine shutdown has occurred. The determination may be made based on sensed parameter values, in one example. The controller may perform step 502 intermittently or on an interrupt basis throughout operation of the climate control system in summer mode while the engine is running (e.g., throughout operation of method 400). If the answer at 502 is NO, method 500 ends.

Otherwise, if the answer at 502 is YES, method 500 continues to 504. At 504, method 500 includes closing the hot PCM battery bypass valve. As described above, the hot PCM battery may be charged with thermal energy from HTF heated via heat exchange with engine exhaust during engine operation, and this thermal energy may be stored for 16 hours after engine shutdown in some examples. Accordingly, by closing the hot PCM battery bypass valve at engine shutdown and prior to desorbing both adsorbers (see step 506), it may be ensured that the hot PCM battery is not bypassed and may deliver hot HTF to desorb the adsorbers.

After 504, method 500 continues to 506. At 506, method 500 includes coupling the hot HTF circuit with both adsorbers to operate both adsorbers in desorbing mode for a duration, and then decoupling the hot HTF circuit from both adsorbers (i.e., after the duration). For example, the controller may control valves 330, 332, 334, 340, 344, 346, 348, and 350 of FIG. 3 such that the hot HTF circuit is fluidly coupled with both adsorbers and hot HTF may be pumped through both adsorbers. Further, the controller may control valve 380 of FIG. 3 such that the condenser is in fluid communication with the enclosures of adsorbers 302 and 304. As a result, any refrigerant that may have been adsorbed at the adsorbers during operation of the climate control system in summer mode may be desorbed such that the adsorbents of both adsorbers are prepared for operation in adsorbing mode at or prior to the next engine start.

After 506, method 500 continues to 508. At 508, method 500 includes decoupling both adsorbers from the refrigerant circuit. For example, as shown in FIGS. 2A and 2B, each adsorber may include an adsorber enclosure containing an adsorbent and one or more fin tubes. A position of a valve such as valve 220 may determine whether the refrigerant circuit may fluidly communicate with the adsorber enclosure. Accordingly, decoupling the refrigerant circuit from both adsorber enclosures may include closing a valve such as valve 220 at each adsorber such that no fluid communication may occur between the adsorber enclosure and the refrigerant circuit. Decoupling the refrigerant circuit from the adsorber enclosures while the engine is shut down may advantageously prevent refrigerant vapor from re-entering the adsorbers while the vehicle is parked. After 508, method 500 ends.

FIG. 5B shows an example method 520 for operation of a climate control system (e.g. climate control system 100 shown in FIG. 1) at or prior to an engine start in summer mode. Specifically, if method 500 of FIG. 5A was performed at a most recent engine shutdown, method 520 may be performed upon engine start.

At 522, method 520 includes determining whether the engine has been started or whether a user has activated the climate control system prior to engine start. For example, the controller may determine whether the engine has been started based on sensed parameter values, e.g. ignition state. The controller may make this determination based on whether a sensor such as fob sensor 120 of FIG. 1 has received input from a remote control such as electronic fob 122 of FIG. 1. If the answer at 522 is NO, method 520 ends.

Otherwise, if the answer at 522 is YES, method 520 proceeds to 524. At 524, method 520 includes closing the cold PCM battery bypass valve. Closing the cold PCM battery bypass valve at step 524 may advantageously enable cooling of both adsorbers in order to carry out a surge cooling mode. During hot weather conditions, the passenger cabin of a vehicle may become uncomfortably hot, for example when the engine is off and the vehicle is parked with the windows closed. Accordingly, it may be desirable to immediately deliver cold air to the passenger cabin, either at climate control system activation prior to engine start (e.g., via remote control) or at engine start. As described above, the cold PCM battery may be charged with thermal energy from cooled refrigerant during engine operation, and this thermal energy may be stored for 16 hours after engine shutdown in some examples. Accordingly, by closing the cold PCM battery bypass valve when the climate control system is activated, it may be ensured that the cold PCM battery is not bypassed and may deliver cooled refrigerant to the evaporator at this time to achieve immediate delivery of cold air to the passenger cabin. Meanwhile, it will be appreciated that the hot PCM battery bypass valve remains closed after having been closed at step 504 of method 500. Similar to the cold PCM battery, the hot PCM battery may retain thermal energy (e.g., energy stored in the hot PCM battery via heated HTF during the previous engine operation) for up to 16 hours after engine shutdown in some examples. Accordingly, by keeping the hot PCM battery bypass valve closed when the climate control system is activated, immediate delivery of hot HTF to the desorbing adsorber may be possible once the engine warms up, in case the heat of engine exhaust is not yet sufficient at that point to effect desorption at the desorbing adsorber.

After step 524, method 520 continues to 526. At 526, method 520 includes coupling both adsorbers with the evaporator. For example, the controller may control a valve such as valve 378 of FIG. 3 such that the evaporator is in fluid communication with the enclosures of adsorbers 302 and 304. Although the adsorbers are not coupled with condenser 364, sufficient refrigerant may have condensed at condenser 364 during the desorption of both adsorbers at the previous engine shutdown (see step 506 of method 500) for provision to the evaporator via the refrigerant circuit, for cabin cooling during the duration.

After 526, method 520 continues to 528. At 528, method 520 includes coupling the cold HTF circuit with both adsorbers to operate both adsorbers in the adsorbing mode for a duration. For example, the controller may control valves 330, 332, 334, 340, 344, 346, 348, and 350 of FIG. 3 such that the cold HTF circuit is fluidly coupled with both adsorbers and cold HTF may be pumped through both adsorbers.

After 528, method 520 continues to 530. At 530, method 520 includes activating the condenser fan and evaporator blower. Activation of the condenser fan cools refrigerant at the condenser by rejecting heat to ambient air, whereas activation of the evaporator blower effects the direction of ambient or cabin air through the evaporator for cooling and the redirection of cooled air to the passenger cabin.

Accordingly, operation of the climate control system in accordance with method 520 may achieve surge cooling of the passenger cabin via the operation of both adsorbers in the adsorbing mode in conjunction with the immediate provision of cold refrigerant from the cold PCM battery to the evaporator.

Figure 6:
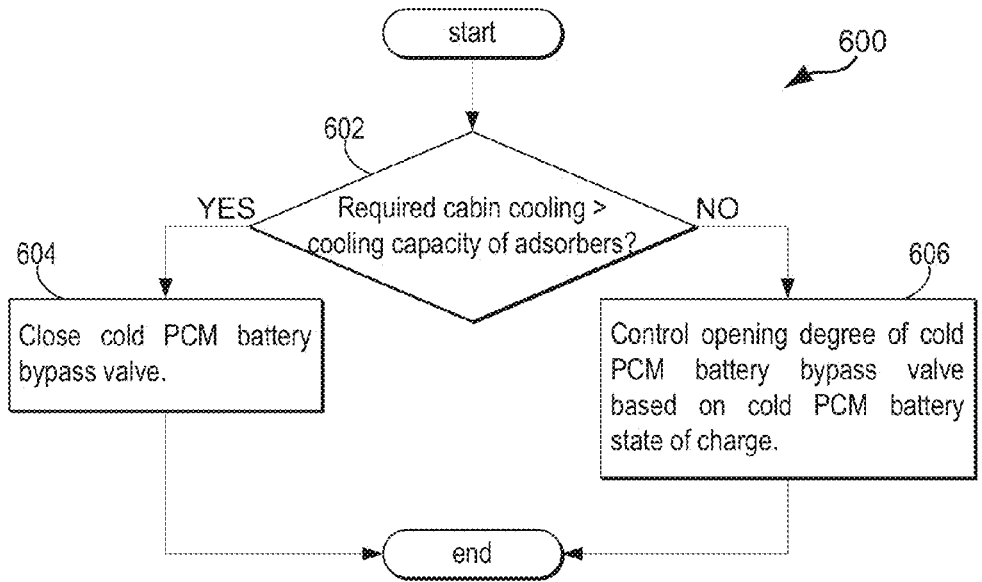
FIG. 6 depicts an example method for controlling the cold PCM battery bypass valve, which may be used in conjunction with the method of FIG. 4.

FIG. 6 shows an example method 600 for controlling the cold PCM battery bypass valve. For example, method 600 may be executed by control system 114 during operation of the climate control system in the summer mode, e.g. at step 404 of method 400.

At 602, method 600 includes determining whether the required cabin cooling is greater than a cooling capacity of the adsorbers. The required cabin cooling may be determined by the controller based on sensed outside air temperature and sensed cabin air temperature, other sensed parameters, or may be based on a climate control system setting input by a user, for example. The cooling capacity of the adsorbers may be a cooling capacity of the adsorbers in normal, asynchronous operation, or may alternatively correspond to a cooling capacity of the adsorbers when both adsorbers are operated in adsorbing mode.

If the answer at 602 is YES, method 600 continues to 604. At 604, method 600 includes closing the cold PCM battery bypass valve. In this way, thermal energy stored in the cold PCM battery during the previous engine operation, and perhaps thermal energy being stored in the cold PCM battery during the present engine operation, may assist the adsorbers in cooling refrigerant in the refrigerant, in order to achieve the required cabin cooling. After 604, method 600 ends.

Otherwise, if the answer at 602 is NO, the cooling capacity of the adsorbers is sufficient to meet current cabin cooling requirements. In this case, it may be desirable to at least partially bypass the cold PCM battery to expedite delivery of cooled refrigerant from the refrigerant circuit to the evaporator to cool the cabin. However, it may also be desirable to take into account the current state of charge of the cold PCM battery, to ensure that the cold PCM battery may assist the adsorbers with cooling during a future surge cooling operation, or if operating conditions change such that the required cabin cooling exceeds the cooling capacity of the adsorbers. Accordingly, at 606, method 600 includes controlling the opening degree of the cold PCM battery bypass valve based on the state of charge of the cold PCM battery. For example, if the cold PCM battery is fully charged, it may be desirable to fully open the cold PCM battery bypass valve such that refrigerant fully bypasses the cold PCM battery (thereby expediting delivery of refrigerant from the expansion valve to the evaporator). Alternatively, if the cold PCM battery charge is below a threshold, it may be desirable to partially open the cold PCM battery bypass valve, such that some refrigerant flows through and charges the cold PCM battery while some refrigerant bypasses the cold PCM battery. Accordingly, a compromise may be reached between expeditious delivery of refrigerant to the evaporator and charging of the cold PCM battery via control of the opening degree of the cold PCM battery bypass valve. After 606, method 600 ends.

Figure 7:
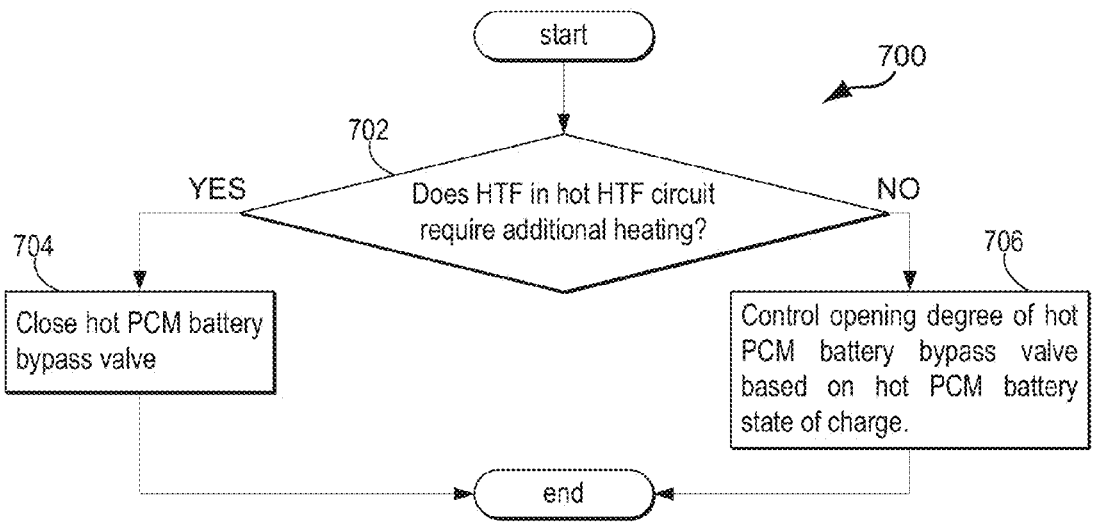
FIG. 7 depicts an example method for controlling the hot PCM battery bypass valve, which may be used in conjunction with the methods of FIGS. 4 and 8.

FIG. 7 shows an example method 700 for controlling the hot PCM battery bypass valve. For example, method 600 may be executed by control system 114 during operation of the climate control system in the summer mode, e.g. at step 404 of method 400, and during the winter mode, e.g. at step 904 of method 900.

At 702, method 700 includes determining whether the HTF in the hot HTF circuit requires additional heating. This determination may be based on a sensed temperature of the HTF in the hot HTF circuit, a sensed temperature of engine exhaust, or based on a duration of time elapsed since engine start, for example. For example, at engine start before the engine has warmed up, e.g. before engine exhaust temperature has reached a predetermined threshold, heat collected at the exhaust heat collector and exchanged with the HTF in the hot HTF circuit may not adequately heat the HTF. During summer mode, for example, the HTF may not be hot enough to effect desorption, whereas during winter mode, the HTF may not be hot enough to provide a desired level of heating to cabin air in conjunction with the heat exchanger.

If the answer at 702 is YES, method 700 continues to 704. At 704, method 700 includes closing the hot PCM battery bypass valve. In this way, thermal energy stored in the hot PCM battery during the previous engine operation, and perhaps thermal energy being stored in the hot PCM battery during the present engine operation, may assist the exhaust heat collector with heating of the HTF in the hot HTF circuit. After 704, method 700 ends.

Otherwise, if the answer at 702 is NO, the HTF in the hot HTF circuit does not require additional heating. In this case, it may be desirable to at least partially bypass the hot PCM battery to expedite delivery of HTF to the adsorber(s) during summer mode, or to the heater core during winter mode. However, it may also be desirable to take into account the current state of charge of the hot PCM battery, to ensure that the hot PCM battery may provide immediate delivery of heat during a future surge heating operation, or if operating conditions change such that the HTF in the hot HTF circuit requires additional heating, for example. Accordingly, at 706, method 700 includes controlling the opening degree of the hot PCM battery bypass valve based on the state of charge of the hot PCM battery. For example, if the hot PCM battery is fully charged, it may be desirable to fully open the hot PCM battery bypass valve such that HTF in the hot HTF circuit fully bypasses the hot PCM battery (thereby expediting delivery of HTF from the exhaust heat collector to the adsorber(s) during summer mode or to the heater core during winter mode). Alternatively, if the hot PCM battery charge is below a threshold, it may be desirable to partially open the hot PCM battery bypass valve, such that some HTF flows through and charges the hot PCM battery while some HTF bypasses the hot PCM battery. Accordingly, a compromise may be reached between expeditious delivery of HTF to the adsorber(s) or heater core and charging of the hot PCM battery, via control of the opening degree of the hot PCM battery bypass valve. After 706, method 700 ends.

FIG. 8 shows an example method 800 for operation of a climate control system (e.g. climate control system 100 shown in FIG. 1) in the winter mode described herein. For example, the climate control system may be operated in accordance with method 800 when a currently sensed ambient temperature is lower than a second threshold (which may be equal to or lower than the first threshold discussed above with regard to the summer mode), or when a mean temperature determined based on a record of sensed ambient temperature values is lower than the second threshold. Alternatively, winter mode operation may be selected via user prior to or at engine start, for example via electronic fob 122 of FIG. 1. For example, the user may select a desired mode from among summer and winter modes, air-conditioning and heating modes (where an air-conditioning mode may correspond to summer mode operation and a heating mode may correspond to winter mode operation), or the user may select a desired temperature (which the climate control system may translate into summer or winter mode operation depending on its value). In another example, the user may activate the climate control system without indicating a desired mode or temperature, e.g. via an electronic fob, and the control system may determine an appropriate mode of operation based on ambient conditions.

It will be appreciated that during winter mode operation, the adsorbers and refrigerant circuit may not be used; instead, the hot HTF circuit and heater core may provide cabin heating.

At 802, method 800 includes determining whether the engine has warmed up after engine start. The determination may be based on whether a predetermined duration has elapsed since engine start, sensed temperatures (e.g. exhaust pipe temperature, engine coolant temperature, etc.), a number of combustion cycles performed since engine start, etc.

If the answer at 802 is NO, the engine has not yet warmed up after engine start, and method 800 ends. Operation of the climate control system in winter mode prior to engine warm up (e.g., at or prior to engine start) will be described herein with respect to the method of FIG. 9.

Otherwise, if the answer at 802 is YES, method 800 continues to 804. At 804, method 800 includes controlling the hot PCM battery bypass valve a based on operating conditions. Such control of the hot PCM battery bypass valve is described above with respect to FIG. 7. For example, the hot PCM battery bypass valve may be controlled based on a state of charge of the battery, whether required heating of HTF in the hot HTF circuit can be provided by heat exchange with engine exhaust alone, etc.

After 804, method 800 continues to 806. At 806, method 800 includes coupling the heater core with the hot HTF circuit. For example, the controller may control a valve such as valve 382 of FIG. 3 such that HTF is pumped by pump 310 to heater core 328, and not to the adsorbers.

After 806, method 800 continues to 808. At 808, method 800 includes directing ambient air or cabin air through the heater core and then to the passenger cabin via a blower. For example, a blower such as blower 376 shown in FIG. 3 may be controlled by the controller to direct outside air through a heater core such as heater core 328 for heating, and then to direct the heated air to the passenger cabin. Accordingly, the heater core may exchange heat between HTF from the hot HTF circuit and ambient air or cabin air in order to heat the passenger cabin. After 808, method 800 ends.

FIG. 9 shows an example method 900 for operation of a climate control system (e.g. climate control system 100 shown in FIG. 1) in winter mode at or prior to engine start, to provide surge heating to the passenger cabin.

At 902, method 900 includes determining whether the engine has been started or whether a user has activated the climate control system prior to engine start. For example, the controller may determine whether the engine has been started based on sensed parameter values, e.g. ignition state. Alternatively, the controller may determine that a user has activated the climate control system prior to engine start based on whether a sensor such as fob sensor 120 of FIG. 1 has received input from a remote control such as electronic fob 122 of FIG. 1.

If the answer at 902 is NO, method 900 ends. Otherwise, if the answer at 902 is YES, method 900 continues to 904. At 904, method 900 includes closing the hot PCM battery bypass valve. During cold weather conditions, the passenger cabin of a vehicle may become uncomfortably cold while the engine off (e.g., when the vehicle is parked outside overnight). Accordingly, it may be desirable to immediately deliver hot air to the passenger cabin, either at climate control system activation prior to engine start (e.g., via remote control) or at engine start. As described above, the hot PCM battery may be charged with thermal energy from HTF heated via heat exchange with engine exhaust during engine operation, and this thermal energy may be stored for 16 hours after engine shutdown in some examples. Accordingly, by closing the hot PCM battery bypass valve when the climate control system is activated, it may be ensured that the hot PCM battery is not bypassed and may deliver hot HTF to the heater core at this time to achieve immediate delivery of hot air to the passenger cabin.

After step 904, method 900 continues to 906. At 906, method 900 includes, for a duration, pumping HTF through the hot PCM battery, into the heater core, and then into the exhaust heat collector while directing cabin air or outside air through the heater core and directing the heated air to the cabin. For example, the controller may control valves such as valves 382 and 344 of FIG. 3 such that the heater core is coupled with hot HTF circuit, and the adsorbers are not coupled with the hot HTF circuit. Then, the controller may control a pump such as pump 310 of FIG. 3 to pump HTF through the heater core and then into the exhaust heat collector. Meanwhile, the controller may activate a blower such as blower 376 coupled with the heater core and control the blower to direct either cabin air or outside air through the heater core for heat exchange with the hot HTF flowing therethrough. Finally, the controller may control the blower to direct the heated air to the passenger cabin, thereby heating the passenger cabin.

Accordingly, operation of the climate control system in accordance with method 900 may achieve surge heating of the passenger cabin via the operation of the heater core and hot HTF circuit in conjunction with the immediate provision of hot HTF from the hot PCM battery to the heater core.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method for a vehicle climate control system, comprising:
    during a summer mode, driving first and second adsorbers with heat transfer fluid (HTF) heated by engine exhaust in a hot HTF circuit and HTF cooled by an HTF cooler in a cold HTF circuit, and charging a standalone cold phase change material (PCM) battery communicating with the adsorbers; and
    during a winter mode, coupling the hot HTF circuit with a heater core.

2. The method of claim 1, further comprising, during the summer and winter modes, charging a standalone hot PCM battery arranged in the hot HTF circuit.

3. The method of claim 2, further comprising, during the summer mode, asynchronously switching the first and second adsorbers between adsorbing and desorbing modes, the adsorbing adsorber adsorbing refrigerant from an evaporator arranged downstream of the cold PCM battery, and the desorbing adsorber desorbing refrigerant to a condenser arranged upstream of a thermal expansion valve, while controlling a cold PCM battery bypass valve based on operating conditions.

4. The method of claim 3, further comprising:
    during the summer mode, cooling a passenger cabin of the vehicle by directing cabin air or ambient air across the evaporator via a blower and directing the cooled air to the cabin; and
    during the winter mode, heating the cabin by directing cabin air or ambient air across the heater core via a blower and directing the heated air to the cabin.

5. The method of claim 4 further comprising, during the summer and winter modes, controlling a hot PCM battery bypass valve based on operating conditions.

6. The method of claim 5, further comprising, during the summer mode:
    if required cabin cooling is greater than a cooling capacity of the adsorbers, closing the cold PCM battery bypass valve; and
    if required cabin cooling is not greater than a cooling capacity of the adsorbers, controlling an opening degree of the cold PCM battery bypass valve based on a state of charge of the cold PCM battery.

7. The method of claim 6, further comprising, during the summer and winter modes:
    if HTF in the hot HTF circuit requires additional heating, closing the hot PCM battery bypass valve; and
    if HTF in the hot HTF circuit does not require additional heating, controlling an opening degree of the hot PCM battery bypass valve based on a state of charge of the hot PCM battery.

8. The method of claim 7 further comprising:
    after engine shutdown during the summer mode, desorbing both adsorbers with HTF from the hot PCM battery for a duration; and at or prior to a next engine start, adsorbing both adsorbers with HTF from the cold PCM battery for a duration in a surge cooling mode.

9. The method of claim 8 further comprising:
at or prior to an engine start in the winter mode, directing HTF from the hot PCM battery to the heater core for a duration in a surge heating mode.

10. The method of claim 9, further comprising activating the surge cooling or heating modes prior to engine start responsive to remote control by a user.

11. The method of claim 10, further comprising conditioning cabin air via the summer, winter, surge cooling, and surge heating modes without using engine coolant or an engine-driven compressor.

12. A vehicle climate control system, comprising:
at least two adsorbers alternating between adsorbing and desorbing modes during a summer mode;
a standalone cold phase change material (PCM) battery arranged upstream of an evaporator and downstream of an expansion valve and a condenser in a refrigerant circuit; and
a standalone hot PCM battery couplable with a heater core during a winter mode and with the adsorbers during the summer mode.

13. The system of claim 12, further comprising a hot heat transfer fluid (HTF) circuit comprising an exhaust heat collector and the hot PCM battery and a cold HTF circuit comprising an HTF cooler, wherein the system does not include engine coolant or an engine-driven compressor.

14. The system of claim 13, wherein each adsorber comprises one or more fin tubes thermally coupled with an adsorbent, and wherein HTF from the hot HTF circuit or the cold HTF circuit flows through the fin tubes of each adsorber depending on an operating mode of the system.

15. A method for operating a vehicle climate control system, comprising:
during a summer mode, cooling refrigerant via thermal adsorption and providing supplemental cooling of refrigerant via a cold phase change material (PCM) battery as needed;
during the summer mode and a winter mode, heating heat transfer fluid (HTF) via heat exchange with engine exhaust during the summer mode and the winter mode and providing supplemental heating of HTF via a hot PCM battery as needed.

16. The method of claim 15, further comprising conditioning passenger cabin air with the cooled refrigerant during the summer mode and the heated HTF during the winter mode.

17. The method of claim 16, wherein conditioning passenger cabin air with the cooled refrigerant during the summer mode comprises directing cabin air or ambient air across an evaporator arranged downstream of the cold PCM battery via a blower and directing the cooled air to the cabin, and wherein conditioning passenger cabin air with the heated HTF during the winter mode comprises directing cabin air or ambient air across a heater core via a blower and directing the heated air to the cabin.

18. The method of claim 17 further comprising, during the summer and winter modes, controlling a hot PCM battery bypass valve based on operating conditions, and during the summer mode, controlling a cold PCM battery bypass valve based on operating conditions.

19. The method of claim 18, further comprising:
during the summer mode, desorbing refrigerant from two adsorbers for a duration after engine shutdown and then adsorbing refrigerant at the two adsorbers for a duration prior to or at a next engine start;
during the winter mode, after engine shutdown at or prior to an engine start, directing HTF from the hot PCM battery to a heater core for a duration.

20. The method of claim 19, further comprising conditioning cabin air without using engine coolant or an engine-driven compressor.

* * * * *